United States Patent [19]
Wallick et al.

[11] 3,974,967
[45] Aug. 17, 1976

[54] LAWN-TREATING APPARATUS
[75] Inventors: Seymour Dudley Wallick, Clifton; Joseph J. Sandler, Wayne; Marc L. Sandler, Livingston; Frank Zabroski, Convent Station, all of N.J.
[73] Assignee: Lawn King, Inc., Fairfield, N.J.
[22] Filed: July 9, 1975
[21] Appl. No.: 594,198

[52] U.S. Cl. ............................... 239/656; 222/25; 222/41; 222/505
[51] Int. Cl.$^2$ ......................................... A01C 7/06
[58] Field of Search .............. 222/505, 41, 145, 25, 222/26, 41; 239/656, 684

[56] References Cited
UNITED STATES PATENTS

| | | | |
|---|---|---|---|
| 495,590 | 4/1893 | Kaucher | 222/41 |
| 627,983 | 7/1899 | Corser | 222/41 X |
| 3,153,494 | 10/1964 | Heider | 222/145 X |
| 3,167,319 | 1/1965 | Kerr | 239/684 X |
| 3,685,468 | 8/1972 | Paige | 239/656 |

*Primary Examiner*—Allen N. Knowles
*Assistant Examiner*—Hadd Lane
*Attorney, Agent, or Firm*—Lerner, David, Littenberg & Samuel

[57] ABSTRACT

Apparatus for treating lawns which includes a plurality of hoppers calibrated to dispense predetermined amounts of seed and fertilizer, wherein each of the hoppers includes an opening for feeding material therefrom and means are provided for adjusting the hopper feed opening. The adjusting means includes a movable closure bar which slides between an open and closed position for opening and closing each hopper feed opening. The movable closure bar is actuated by a rack and pinion, and the rack is connected to the movable closure bar by a plate member. The closure bar and plate member are arranged to slide relative to a stationary guide. An indicator dial is also provided for indicating the position of the closure bar relative to the hopper feed opening.

The hoppers direct the seed and fertilizer to a distribution plate which distributes it over a wide lawn area. An impeller assembly is mounted in a compartment of the apparatus for driving the distribution plate, and a deflector plate is mounted on the bottom of the compartment for preventing the distribution plate from distributing seed and fertilizer upwardly into the compartment. The deflector plate operates to deflect the seed and/or fertilizer downwardly and over a wide lawn area.

The impeller assembly includes a motor and shaft for driving the distribution plate. The motor shaft is surrounded by protective bearings for allowing the motor shaft some play so it may be moved when the distribution plate engages a lawn obstruction and thereby prevent damage to the motor and shaft of the impeller assembly.

3 Claims, 6 Drawing Figures

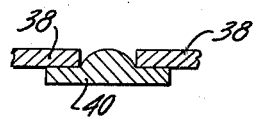
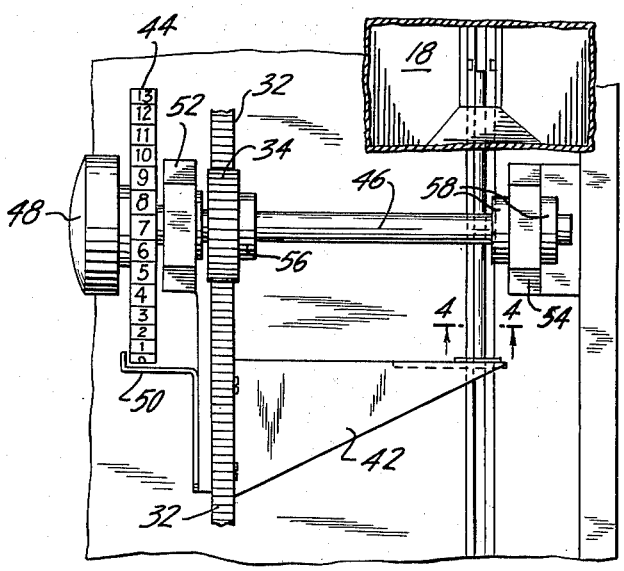
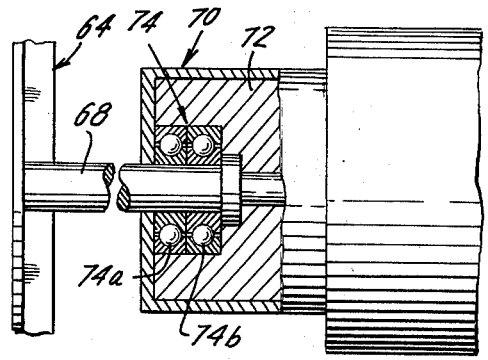
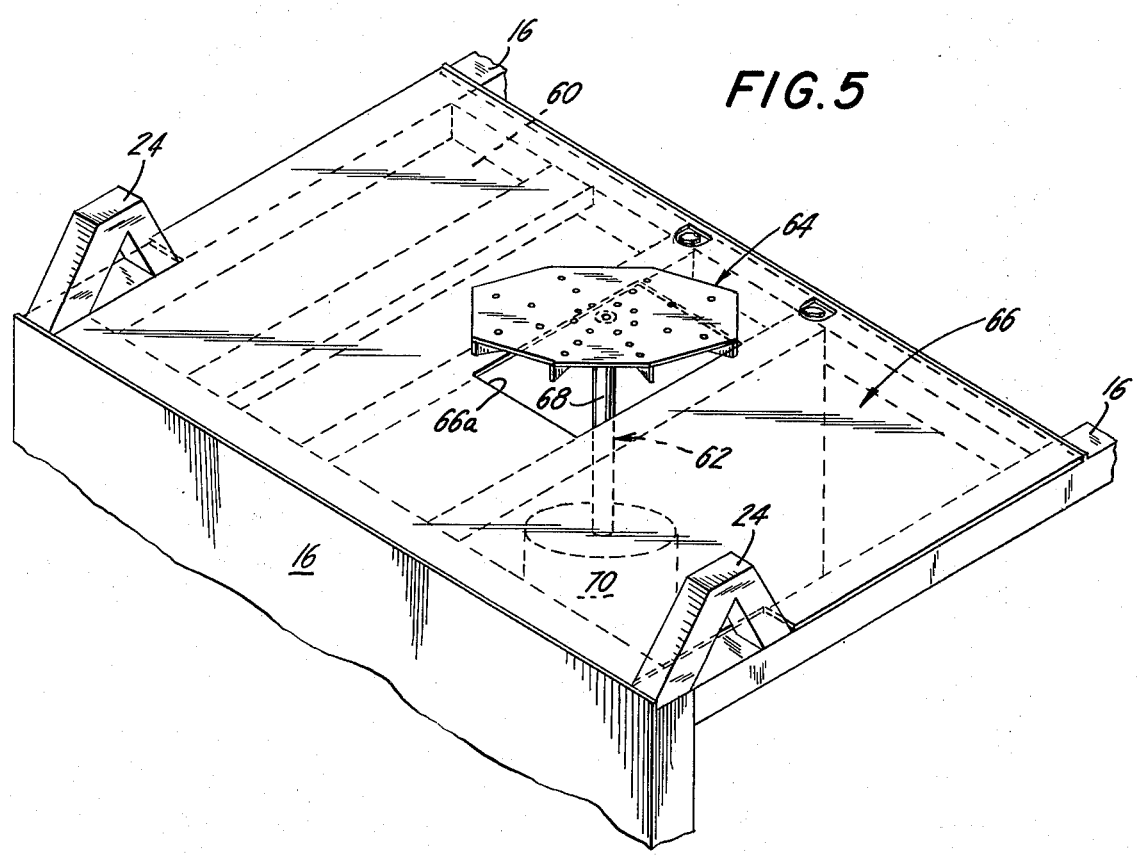

LAWN-TREATING APPARATUS

FIELD OF THE INVENTION

This invention relates to apparatus for treating lawns and, in particular, to improvements in such apparatus for dispensing predetermined amounts of seed and fertilizer to a wide lawn area.

BACKGROUND OF THE INVENTION

In recent years, apparatus has been developed for treating lawns which is capable of performing in one operation the steps of seeding, fertilizing, rolling, and aerating lawns and for dispensing chemicals to control weeds, fungus, and insects. Such lawn-treating apparatus usually includes a plurality of hoppers for dispensing seed and fertilizer to the lawn. In the past, the size of the feed openings of the hoppers has been manually adjusted by an operator sliding a closure member between a completely open and completely closed position so as to dispense the proper amount of seed, fertilizer, etc. However, the size to which the hopper feed opening was adjusted was not very accurate, as there were no means for indicating to the operator the size of the opening. As a result, in many cases, the amount of material dispensed would be above or below the required amounts, which could result in improperly treated lawns and less than optimum lawn care. In addition, as the apparatus moves across a typical lawn, it is jolted about and the adjusting mechanism, which has been set by the operator, has a tendency to be moved by such jolts to vary the size of the hopper feed opening. This also results in more or less material being dispensed to the lawn and less than optimum lawn care. Accordingly, it would be desirable to provide means for positively adjusting the size of the hopper feed openings so that they would not be susceptible to the settings being accidentally changed by jolts or any other means during movement of the apparatus across the lawn. In addition, it would also be desirable to provide means for indicating to the operator the size of the hopper feed openings so that such openings may be uniformly set to accurately dispense the proper amounts of material.

Typically, such apparatus includes a distribution plate for distributing the material dispensed from the hoppers to the lawn. However, it has been found that such distribution plates have a tendency of dispensing some material upwardly into the compartment of the apparatus which houses the mechanical components for controlling the aerating, rolling, and chemical dispensing mechanisms of the apparatus. As a result, the dispensed material, such as the seed and fertilizer, has a tendency to build up and/or become embedded within the compartment and thereby interfere with the operation of and/or damage such components. Accordingly, it would also be desirable to provide such apparatus with means for avoiding such damage and also for eliminating the loss of material which becomes embedded therein.

It is also typical of such lawn-care apparatus to engage lawn obstructions as it traverses a typical lawn area. As a result, the distribution plate, which is only a few inches from the ground, in many cases engages such obstructions and is damaged so that it has to be either repaired or replaced. Further, when the distribution plate is damaged, there is a greater tendency for the material to be dispensed upwardly into the compartment, and the need for providing means for preventing such entry of the material into the compartment becomes even more important, as the resulting damage is even more pronounced. Moreover, if the lawn obstruction is large enough, the entire impeller assembly, which drives the distribution plate, may also become damaged. As a result, the motor and shaft of the impeller assembly may have to be replaced or repaired. Accordingly, it would also be desirable to provide some inexpensive means for avoiding damage to the entire impeller assembly when the distribution plate engages a lawn obstruction.

Therefore, it is an overall object of the present invention to provide an improved apparatus for treating lawns which more efficiently and accurately dispenses lawn materials without interfering with the operating mechanisms of the lawn apparatus and which also avoids major damage to the apparatus when a lawn obstruction is encountered.

More specifically, it is an object of this invention to permit the hopper feed openings to uniformly be set to predetermined sizes in order to accurately dispense the desired amounts of material to the lawn and to also avoid the setting from accidentally being changed by jolts during movement of the lawn apparatus across a lawn.

It is a further object of this invention to prevent material from being distributed into the operating compartment of the lawn apparatus and interferring with the operation thereof and to also decrease the amount of lawn material which is wasted.

It is a still further object of this invention to provide a lawn apparatus which is capable of engaging lawn obstructions without major damage resulting to the impeller assembly thereof.

BRIEF DESCRIPTION OF THE INVENTION

In accordance with an illustrative embodiment demonstrating objects and features of the present invention, there is provided apparatus for treating lawns which includes a plurality of hoppers calibrated to dispense predetermined amounts of seed and fertilizer , wherein each of the hoppers includes an opening for feeding material therefrom and which are provided with means for positively adjusting the size of the hopper feed opening. The adjusting means includes a movable closure bar which slides between an open and closed position for opening and closing each hopper feed opening. The movable closure bar is actuated by a rack and pinion with the rack being connected to the movable closure bar by a suitable plate member. The rack and pinion arrangement prevents the closure bar from being moved from its predetermined setting by jolts or otherwise. The closure bar and plate member are arranged to slide relative to a stationary guide. An indicator dial is also provided for accurately and uniformly indicating the position of the closure bar relative to the hopper feed opening and for accurately varying the size of the openings.

The hopper feed openings are arranged to dispense the seed and fertilizer to a rotating distribution plate so that the material may be distributed over a wide lawn area. An impeller assembly for driving the distribution plate is mounted in an operating compartment of the apparatus, and a deflector plate is mounted on the bottom of the compartment for preventing the distribution plate from distributing seed and fertilizer upwardly into the compartment. The deflector plate operates to deflect the seed and/or fertilizer downwardly and over a wide lawn area. This prevents buildup of the material in the compartment and avoids damage to the components housed therein.

The impeller assembly is mounted in the operating compartment and includes a motor and shaft for driving the distribution plate. The motor shaft is surrounded by protective bearings for allowing the motor shaft some play relative to the motor housing so that it may be moved when the distribution plate engages a lawn obstruction and thereby prevent damage to the motor and shaft of the impeller assembly.

The above description, as well as further objects, features and advantages of the present invention, will be more fully understood by reference to the following detailed description of the presently-preferred, but nonetheless, illustrative embodiment in accordance with the present invention.

DESCRIPTION OF THE DRAWINGS

For a more complete understanding of the invention, reference should be made to the following detailed description and drawings in which:

FIG. 3 is an enlarged fragmentary plan view of the hopper adjustment mechanism of the present invention;

FIG. 4 is an enlarged fragmentary sectional view, taken substantially along the line 4—4 in FIG. 3 and looking in the direction of the arrows, illustrating further details of the hopper adjustment mechanism of the present invention;

FIG. 5 is an enlarged bottom plan view, showing in detail the interior of the operating compartment, the distribution plate, and the impeller assembly; and FIG. 6 is an enlarged fragmentary view, partially broken away and in section for purposes of clarity, illustrating the protective bearings of the impeller assembly of the present invention.

Figure 1:
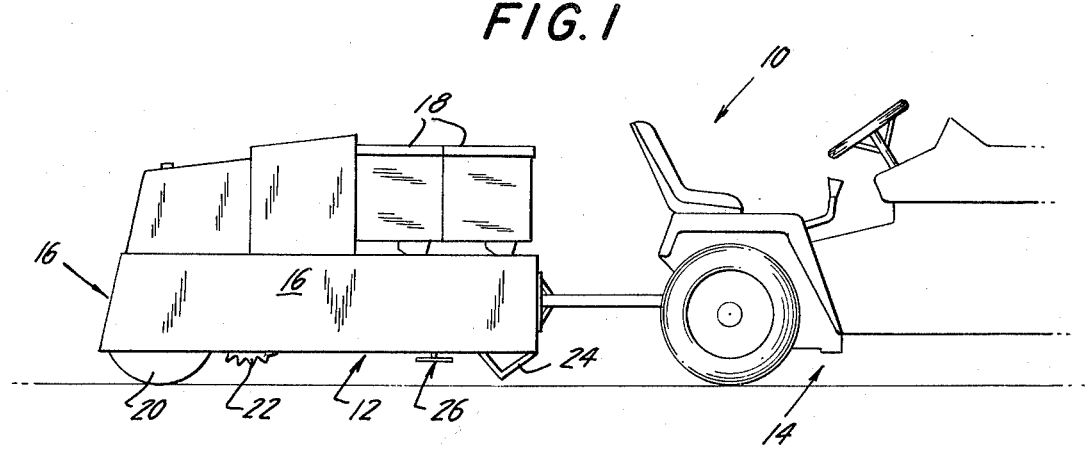
FIG. 1 is a side view of a representative form of the present invention, which includes a tractor for pulling the lawn-treating equipment.

Referring now specifically to the drawings, and in particular to FIG. 1, there is shown an illustrative apparatus embodying features of the present invention, generally designated by the reference numeral 10, which includes a carrier 12 for the lawn-treating equipment connected to a suitable tractor 14 for driving the carrier 12 along the lawn to be treated. The carrier 12 includes a body frame 16 which is constructed and arranged to carry a plurality of hoppers 18 which are calibrated to dispense predetermined amounts of seed, fertilizer, and chemicals. Carrier 12 also includes a roller 20 for smoothing out the lawn surface, an aerator mechanism 22 for aerating the soil and a suitable support 24 on which carrier 12 rests when not in use. There is also shown a portion of the impeller assembly 26 which will be described below in greater detail.

Figure 2:
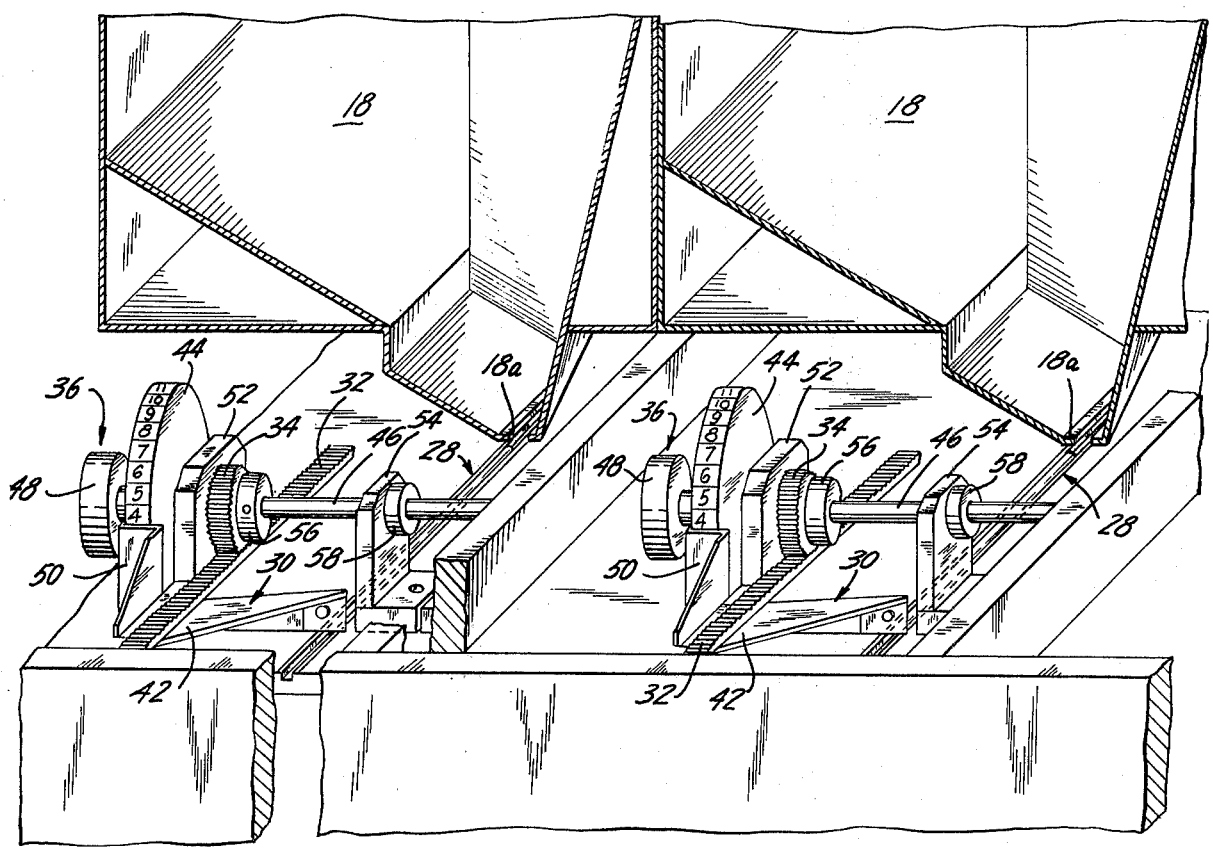
FIG. 2 is a fragmentary view, partially in section, illustrating in detail the hopper feed openings and the means for positively adjusting such openings.

In FIG. 2, two of the hoppers 18 are shown in detail in conjunction with the apparatus of the present invention for adjusting the hopper feed openings 18a. The adjusting apparatus includes sliding means 28 which slide between an open and closed position for adjusting the size of the hopper feed openings 18a. Apparatus 30 is provided for actuating sliding means 28 and includes a rack 32 and pinion 34. Rack 32 is operatively connected to sliding apparatus 28 for actuating sliding apparatus 28 between its open and closed positions. An indicator 36 is also provided and is operatively connected to sliding apparatus 28 for indicating the position of sliding apparatus 28 relative to hopper feed openings 18a to indicate the size of the openings.

As shown most clearly in FIG. 4, sliding apparatus 28 includes a stationary guide 38 and a movable closure bar 40 mounted for sliding movement relative to stationary guide 38. As shown most clearly in FIG. 3, the actuating apparatus 30 includes a plate member 42 having a substantially triangular configuration with one end thereof being connected to rack 32 and the other end thereof being connected to movable closure bar 40 so that rack 32, plate member 42, and movable closure bar 40 may be moved as a unit.

Indicator 36 includes an indicator dial 44 having suitable indicia thereon to indicate the size to which hopper feed openings 18a are adjusted. Indicator dial 44 is mounted on the same shaft 46 as is pinion 34. Also mounted on one end of shaft 46 is an actuating knob 48 which operates to rotate indicator dial 44 and pinion 34 to drive actuating apparatus 30. In order to read the setting on indicator dial 44, a bracket 50 is provided, the top end of which forms the pointer for indicating to the operator which indicia or setting indicator dial 44 is set at. Shaft 46 is supported by suitable brackets 52, 54 and is journaled in suitable bearings 56, 58.

As will be apparent from FIGS. 1 and 2, hoppers 18 are supported in a suitable compartment 60, which is formed by body frame 16, which surrounds and partially encloses the lower portions of hoppers 18. In FIG. 5, there is shown a bottom view of compartment 60 and the surrounding body frame 16. The bottom of compartment 60 is closed off by a deflector plate 66. Within compartment 60 there is mounted an impeller assembly 62, which drives a distribution plate 64. Impeller assembly 62 includes a shaft 68 for mounting distribution plate 64, and deflector plate 66 includes an opening 66a formed therein so that shaft 68 may extend through opening 66a so that distribution plate 64 is mounted outside of compartment 60 and is suitably spaced from deflector plate 66 approximately two inches. Impeller assembly 62 further includes a motor 70 connected to shaft 68 for driving distribution plate 64.

Hopper feed openings 18a are constructed and arranged relative to opening 66a so that the output of hoppers 18 are directed through opening 66a to fall on distribution plate 64 as it is rotating so that the seed and/or fertilizer may be distributed over a wide lawn area. However, it has been found that distribution plate 64, as it is rotating, tends to disperse or distribute some of the seed and/or fertilizer upwardly into compartment 60. This results in some of the operating mechanisms located within compartment 60 being inteferred with by the seed and/or fertilizer and building up or becoming embedded therein. Accordingly, to prevent this, deflector plate 66 is provided which operates to deflect the seed and/or fertilizer which is dispersed upwardly from distribution plate 64 and direct it downwardly over a wide lawn area.

As may be seen most clearly in FIG. 6, motor 70 includes a housing 72 from which motor shaft 68 extends. Motor shaft 68 is surrounded by a set of protective bearings 74 for preventing damage to motor 70 when distribution plate 64 engages an obstruction on the lawn. More particularly, as carrier 12 traverses a typical lawn, there are usually rocks and/or other obstructions which distribution plate 64 will inevitably encounter. The distribution plate 64 may become damaged, and if the obstruction is large enough, motor shaft 68 may be bent or damaged resulting in motor 70 being damaged. As it is much cheaper to simply replace or repair distribution plate 64 rather than the entire impeller assembly 62, protective bearings 74 are provided which will allow motor shaft 68 some leeway in deflecting when distribution plate 64 engages a lawn obstruction. As a result, protective bearings 74, which allow some play or movement of motor shaft 68, prevent motor 70 from being damaged in a substantial number of cases when lawn obstructions damage distribution plate 64. Accordingly, by employing protective bearings 74, in many cases, it is only necessary to repair or place distribution plate 64 rather than the entire impeller assembly 62, which was the case heretofore. In the particular embodiment shown in FIG. 6, protective bearings 74 include two sets of bearings, 74a, 74b mounted about motor shaft 68 within motor housing 70 for allowing motor shaft 68 to be deflected without damage when the distribution plate 64 engages an obstruction on the lawn being traversed by carrier 12.

In view of the foregoing, it can be seen that there has been provided in accordance with the present invention an improved apparatus for seeding and fertilizing lawns, which includes a number of improvements. More particularly, mechanical apparatus is provided for positively adjusting the size of the hopper feed openings accurately and to particular or predetermined settings. As a result, seed and/or fertilizer may be dispensed with greater accuracy than heretofore, and it is highly unlikely that the setting can accidentally be changed by jolts during movement of the carrier over a lawn. In addition, the use of a deflector plate on the bottom of the carrier compartment 60 improves the distribution of the seed and/or fertilizer over a wider lawn area and operates to prevent the distribution plate from distributing the seed and/or fertilizer upwardly into the compartment and interferring with the mechanical components located therein. Finally, the inclusion of protective bearings within the impeller assembly prevents damage to the entire impeller assembly when the distribution plate engages a lawn obstruction so that, in many cases, it is only necessary to replace or repair the distribution plate rather than the entire impeller assembly as heretofore was the case.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed:

1. Apparatus for treating lawns comprising a plurality of hoppers for dispensing predetermined amounts of seed or fertilizer, each of said hoppers including an opening for feeding material therefrom and means for adjusting each of said hopper feed openings, said adjusting means including:

sliding means including a stationary guide and a movable closure bar for sliding relative to said stationary guide between an open and closed position for adjusting the size of said hopper feed opening;

means for positively actuating said sliding means between said open and closed positions including a rack and pinion operatively connected to said movable closure bar; and indicator means operatively connected to said actuating means for indicating the position of said sliding means relative to said hopper feed opening, said indicator means including an indicator dial and pointer, and a common shaft for mounting said pinion and said indicator dial.

2. Apparatus for treating lawns including a plurality of hoppers for dispensing seed or fertilizer to a distribution plate for distributing the seed or fertilizer over a wide lawn area, said apparatus further comprising:

a compartment for supporting said hoppers, said distribution plate mounted outside of said compartment, an impeller assembly mounted in said compartment for driving said distribution plate, said impeller assembly including a motor connected to a shaft for driving said distribution plate, said motor shaft being surrounded by protective bearings for preventing damage to said motor when said distribution plate engages a lawn obstruction, said protective bearings including two sets of bearings mounted about said motor shaft within said motor housing for preventing said motor shaft from deflecting and causing breakage when said distribution plate engages a lawn obstruction, and a deflector plate mounted on the bottom of said compartment for preventing said distribution plate from distributing the seed or fertilizer into said compartment and for deflecting the seed or fertilizer from said distribution over a wide lawn area.

3. Apparatus in accordance with claim 2, wherein said impeller assembly includes a shaft for mounting said distribution plate, said deflector plate including an opening formed therein, said shaft extending through said plate opening so that said distribution plate is mounted outside of said compartment and is spaced from said deflector plate.

* * * * *